(12) United States Patent
Cachia

(10) Patent No.: US 9,228,657 B2
(45) Date of Patent: Jan. 5, 2016

(54) SEALING ELEMENT

(71) Applicant: Control Techniques Limited, Newtown (GB)

(72) Inventor: Charles Anthony Cachia, Welshpool (GB)

(73) Assignee: CONTROL TECHNIQUES LIMITED, Newtown (GB)

( * ) Notice: Subject to any disclaimer, the term of this patent is extended or adjusted under 35 U.S.C. 154(b) by 68 days.

(21) Appl. No.: 13/875,480

(22) Filed: May 2, 2013

(65) Prior Publication Data

US 2013/0307223 A1 Nov. 21, 2013

(30) Foreign Application Priority Data

May 4, 2012 (GB) .................................. 1207996.8

(51) Int. Cl.
*F16J 15/02* (2006.01)
(52) U.S. Cl.
CPC ................ *F16J 15/02* (2013.01); *F16J 15/025* (2013.01)
(58) Field of Classification Search
CPC .......... F16J 15/10; F16J 15/102; F16J 15/104
USPC .......................................... 277/644, 648, 649
See application file for complete search history.

(56) References Cited

U.S. PATENT DOCUMENTS

| | | | |
|---|---|---|---|
| 2,081,040 A | 5/1937 | King | |
| 2,841,429 A * | 7/1958 | McCuistion | 277/402 |
| 5,653,452 A * | 8/1997 | Jarvenkyla | 277/607 |
| 6,827,353 B2 | 12/2004 | Fonville et al. | |
| 8,262,094 B2 * | 9/2012 | Beele | 277/607 |
| 2009/0261534 A1* | 10/2009 | Pradelle | 277/648 |
| 2010/0084827 A1* | 4/2010 | Peddle | 277/644 |
| 2013/0307227 A1* | 11/2013 | Ueda et al. | 277/648 |
| 2014/0062038 A1* | 3/2014 | Wolf et al. | 277/648 |

FOREIGN PATENT DOCUMENTS

| | | |
|---|---|---|
| EP | 1310709 | 5/2003 |
| EP | 1648025 | 4/2006 |
| FR | 2898835 | 9/2007 |
| WO | 2012/056768 | 5/2012 |

* cited by examiner

*Primary Examiner* — Gilbert Lee
(74) *Attorney, Agent, or Firm* — Harness, Dickey & Pierce, P.L.C.

(57) ABSTRACT

A sealing element (1) comprising, in cross-section, a body (7a) and a first sealing part (8a). The first sealing part (8a) providing a sealing face (12a), the first sealing part being connected to and angularly and resiliently displaceable relative to a first surface of the body (7a).

20 Claims, 8 Drawing Sheets

SECTION A-A

SEALING ELEMENT

CROSS-REFERENCE TO RELATED APPLICATION

This application claims the benefit and priority of Great Britain Patent Application No. 1207996.8, filed May 4, 2012. The entire disclosure of the above application is incorporated herein by reference.

FIELD

The present invention relates to a sealing element, in particular, but not exclusively, a sealing element for sealing between planar surfaces.

BACKGROUND

The use of rubber seals or gaskets is known. The present invention aims to alleviate, at least to a certain extent, the problems and/or address at least to a certain extent the difficulties associated with the prior art.

SUMMARY

According to the present invention, there is provided a sealing element comprising, in cross-section, a body and a first sealing part, the first sealing part providing a sealing face, the first sealing part being connected to and angularly and resiliently displaceable relative to a first surface of the body.

In this way, when in use, the first sealing part provides a seal against a component against which it is placed. Because the first sealing part is resiliently and angularly displaceable, the sealing element may still seek to provide a consistent seal even if the surface of a component against which the sealing element is placed is not perfectly smooth.

Preferably, in cross-section, the sealing element further comprises a second sealing part providing a sealing face, the second sealing part being spaced from the first sealing part and extending substantially perpendicular from the first side of the body. In this way, the second sealing part can provide a first seal, against, for example water and dust, and the first sealing element, can provide a second seal. The provision of two sealing parts provides a double line of defence.

Preferably, in cross-section, the first sealing part, in an unbiased state, forms an angle of less than 90 degrees with the first surface of the body. By providing an angled first sealing part, when in use, a larger area of sealing contact can be provided.

Preferably, in cross-section, the first sealing part, in an unbiased state, is angled toward the second sealing part. In use, where the second sealing part provides an outer sealing part, the first sealing part provides an inner sealing part. Preferably, a pocket or cavity is provided between the first sealing part and the first surface of the body. In use, if, for example, a fluid such as water should pass the second sealing part, the fluid may provide pressure between the first sealing part and the body. This pressure may in turn cause the first sealing part and its outer sealing surface to have an increased sealing force against a component against which the sealing element is positioned.

Preferably, in cross-section, the first sealing part tapers from a first end thereof, where connected to the body, towards a second, free end of the first sealing part. Preferably, the first sealing part is fin shaped. Towards the free end of the first sealing part, the first sealing part may be increasingly flexible. Preferably, in its unbiased state, the sides of the first sealing part are substantially planar.

Preferably, in cross-section, the second sealing part is formed with a radiused, rounded or generally semi-circular profile. Preferably, the second sealing part is formed as a rounded bead. The surface of the radiused, rounded or semi-circular profile may provide a sealing surface.

Preferably, the sealing element comprises, in cross-section, a third sealing part, the third sealing part being formed similarly to the first sealing part, the third sealing part being connected to and inclined at an angle to a second side of the body opposing the first side of the body. In this way, a similar sealing arrangement may be made against components positioned on either side of the sealing element.

Preferably, in cross-section, the first sealing part is substantially in alignment with the third sealing part. An even sealing force may therefore be provided at various points along the sealing element.

Preferably, the sealing element comprises, in cross-section, a fourth sealing part, the fourth sealing part being formed similarly to the second sealing part and extending substantially perpendicular to the first sealing part on the second side of the body opposing the first side of the body.

Preferably, the second sealing part is substantially in alignment with the fourth sealing part.

Preferably, in cross-section, the body is formed at its first end with a stepped profile. Preferably, in cross-section, the body is formed at its second end with a stepped profile.

Such a profile assists the release of the sealing element from a mould during manufacture. Instead of a stepped profile, any irregular profile may be provided.

Preferably, in cross-section, the first and second sides of the body are substantially parallel.

Preferably, in cross-section, the body is formed with a reduced diameter width between the second sealing element and the second end of the body.

Preferably, in cross-section, the sealing element is substantially symmetric along its centreline. The sealing element may be symmetrical along its centreline apart from the stepped ends.

Preferably, the sealing element forms a continuous closed loop. The sealing element may be formed to provide a seal around an aperture in an assembly. The sealing parts may be provided around the entire circumference of the loop.

Preferably, the loop is formed substantially as a rectangle.

Preferably, between adjacent sides of the rectangle, a radiused or rounded corner is provided.

Preferably, the first and second surfaces of the body are parallel to the plane of the loop.

Preferably, an orientation tab is provided at a point on the loop.

Preferably, the sealing element is formed of a resilient material.

Preferably, the sealing element is formed of rubber. Any suitable material may be used depending on the application and environmental considerations.

Preferably, the sealing element is formed of Ethylene Propylene Thermoplastic Rubber.

Preferably, the sealing element is formed integrally as a single piece.

The sealing element may be formed in a mould.

DRAWINGS

The present invention will now be described by way of example with reference to and as illustrated in the accompanying drawings, in which.

DETAILED DESCRIPTION

Figure 1:
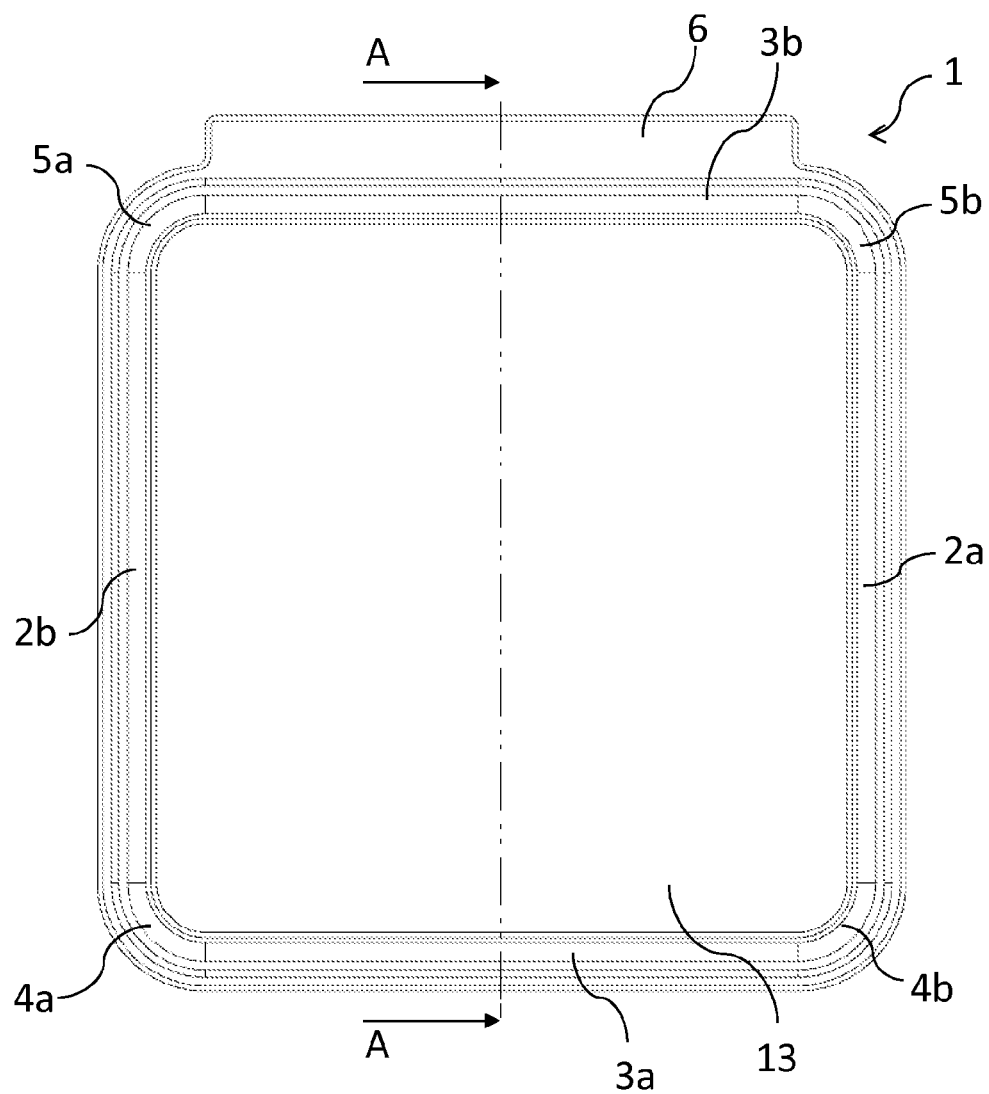
FIG. 1 shows a plan view of a sealing element.

FIG. 1 shows a plan view of a sealing element shown generally at 1 in accordance with a preferred embodiment of the present invention. The sealing element 1 is formed as a closed generally rectangular loop or ring with a through aperture 13. The sealing element comprises two lateral opposing sides, 2a, 2b and two opposing transverse sides 3a, 3b. The lateral sides 2a, 2b and the transverse sides 3a, 3b are connected to each other via radiused or rounded corner sections 4a, 4b, 5a and 5b.

Although not limited to precise dimensions, in the embodiment of the sealing element 1 shown in FIG. 1, the width of the aperture 13 between the lateral sides 2a and 2b is 65.8 mm and the width of the aperture 13 between the two transverse sides 3a, 3b is 67.6 mm. The sealing element can be sized according to application.

The sealing element 1 comprises an orientation tab 6, which in the embodiment shown, is in the form of a rectangular tab which extends along one of the transverse sides 3b of the sealing element 1.

Figure 2:
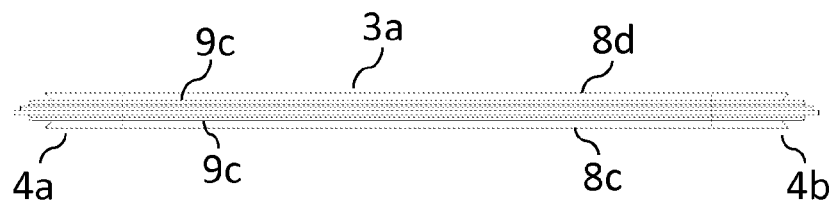
FIG. 2 shows an end side view of the sealing element of FIG. 1.

FIG. 2 shows an end side view of the sealing element 1 as shown in FIG. 1. The sealing element 1 comprises a first sealing part 8c and a third sealing part 8d. The first and third sealing parts 8c, 8d are inclined relative to the plane of the extent of the rectangular loop of the sealing element 1. The sealing element 1 further comprises a second sealing part 9c and a fourth sealing part 9d which extend in a direction substantially perpendicular to the plane of the extent of the rectangular loop of the sealing element 1.

Figure 3:
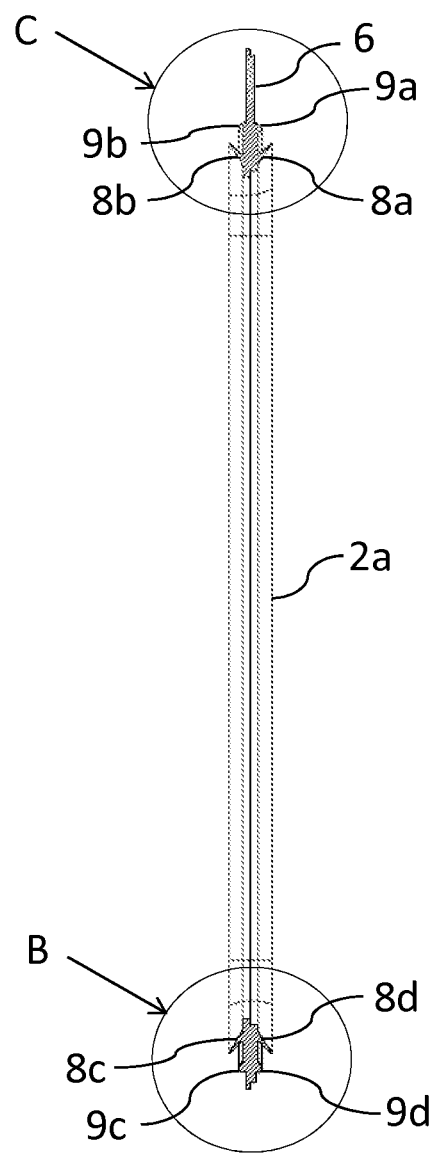
FIG. 3 shows a cross-section along section A-A of FIG. 1.

FIG. 3 shows a cross section A-A through the sealing element as shown in FIG. 1. At the top end of the sealing element 1, the sealing orientation tab 6 is shown. The cross-section shows the profile of the first sealing part 8a and the third sealing part 8b. The cross section also shows the second sealing part 9a and the fourth sealing part 9b. The first, second, third and fourth sealing parts extend around the entire circumference of the loop of the sealing element 1. Accordingly, the first sealing part 8a and third sealing part 8b in highlighted detail C correspond with the first sealing part 8d and third sealing part 8c respectively in highlighted detail B. Similarly, the second sealing part 9a in detail C corresponds with the second sealing part 9d in detail B and the fourth sealing part 9b in detail C corresponds with the fourth sealing part 9c in detail B.

Figure 4:
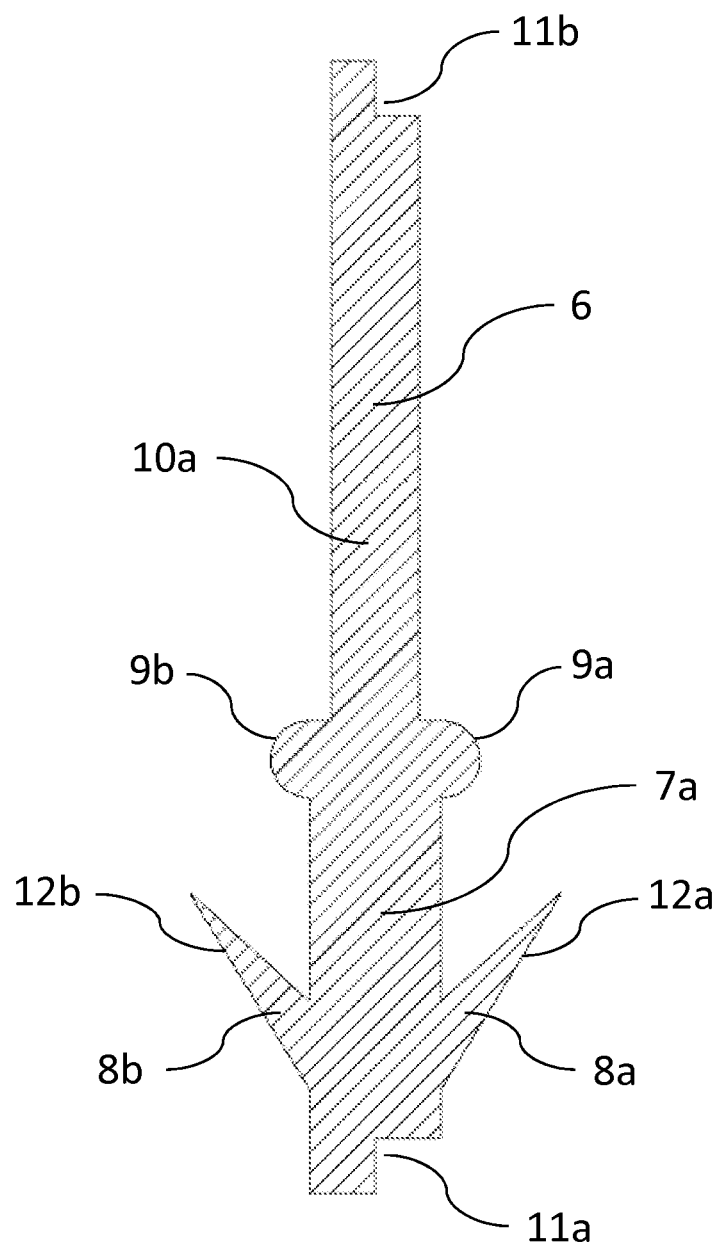
FIG. 4 shows a cross-section detail C on one side of the sealing element at section A-A as shown in FIG. 3.

FIG. 4 shows a cross section of the detail C shown in FIG. 3. In cross-section, the sealing element 1 comprises a body 7a. The body 7a is formed, in cross section, substantially as a rectangle. The body 7a has first and second parallel planar sides. In the embodiment shown, the first sealing part 8a is connected to the first side of the body 7a and the third sealing part 8b is connected to second side of body 7a. Each of the first and third sealing parts 8a, 8b are connected to the body 7a on directly opposing sides of the body 7a. The first and third sealing parts 8a, 8b are orientated, in their unbiased state, i.e. when not displaced, at an angle to the first and second parallel surfaces of the body 7a respectively. Each of the first and third sealing parts 8a, 8b are formed as a tapered protrusion, which tapers from the end connected to the body 7a to the free end of the sealing part 8a, 8b.

On the outermost side, i.e. the side facing away from the body 7a, of each of the sealing parts 8a, 8b, a sealing surface 12a, 12b is provided. The sealing parts 8a, 8b are formed of a resilient material and are angularly displaceable with respect to the first and second parallel sides of the body 7a such that the angle between the innermost sides of the first and third sealing parts 8a, 8b is reduced when the sealing element is displaced, for example, when the sealing element 1 is placed against a surface.

In their unbiased state, the sealing parts 8a, 8b are orientated at an angle of less than 90° with the first and second surfaces of the body 7a. In their unbiased state, the surfaces of the first and third sealing parts 8a, 8b are substantially planar.

Spaced from the first and third sealing parts 8a, 8b, second and fourth sealing parts 9a, 9b are provided. In the embodiment shown, the second and fourth sealing parts 9a, 9b are formed as protrusions which extend substantially perpendicular the first and second surfaces of the body 7a. The second and fourth sealing parts 9a, 9b are formed with a rounded, generally semi-circular profile. In the unbiased state of the first and third sealing parts 8a, 8b, the free ends of the first and third sealing parts 8a, 8b extend laterally further than the extent of the second and fourth sealing parts 9a, 9b from the first and second opposing parallel surfaces of the body 7a.

Beyond the second and fourth sealing parts 9a, 9b on one side of the sealing element 1 the orientation tab 6 is provided. At the innermost side or end of the sealing element, a stepped or irregular profile 11a, 11b is provided. This profile facilitates the removal of the sealing element 1 from a mould during a preferred method of manufacture.

The profile of the sealing element 1 in cross section is substantially symmetrical along its centre line, except for the stepped profile ends 11a, 11b.

Figure 5:
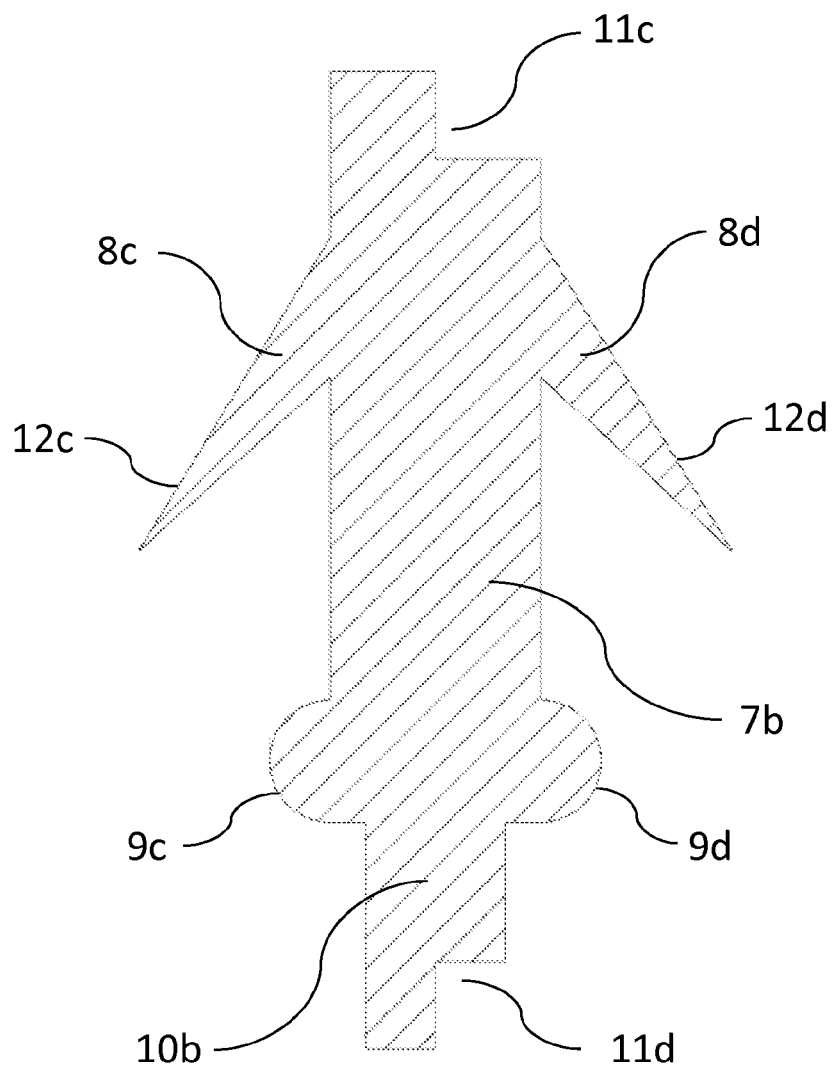
FIG. 5 shows a cross-section detail B of a second side of the sealing element at section A-A as shown in FIG. 3.

FIG. 5 shows the detailed view B of the cross section shown in FIG. 3. As previously outlined, in the embodiment shown, the sealing parts extend around the entire circumference of the rectangular loop and the sealing parts shown in FIG. 5 correspond with those shown in FIG. 4. As such, the parts shown in FIG. 5 function similarly to the parts shown in FIG. 4. However, in FIG. 5, no orientation tab is provided.

The width of the body 7a of the sealing element is reduced for a part of the body 7a which extends beyond the second and fourth sealing part 9a, 9b, 9c, 9d.

Figure 6:
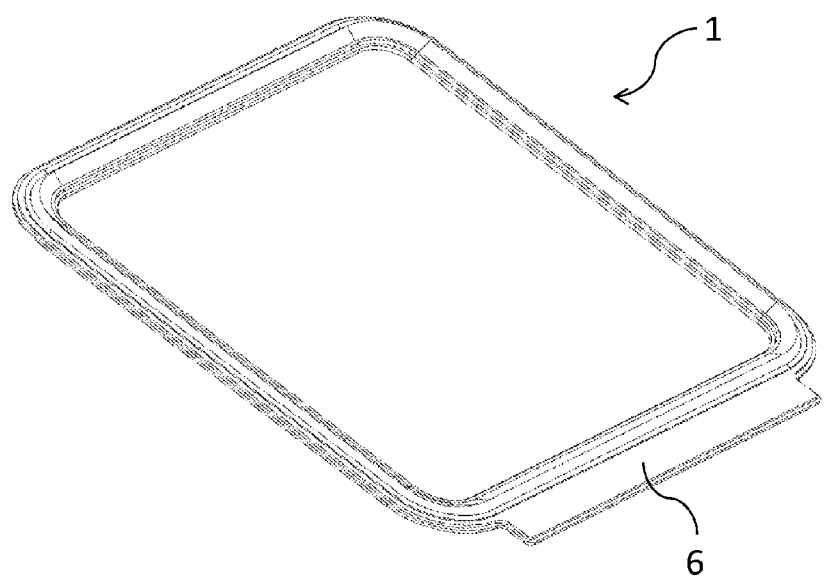
FIG. 6 shows an isometric view of the sealing element of FIG. 1.

FIG. 6 shows an isometric view of the sealing element 1. The orientation tab 6 can be shown located along one side of the rectangular loop of the sealing element 1. The orientation tab 6 facilitates assembly of the sealing element with other components.

Figure 7:
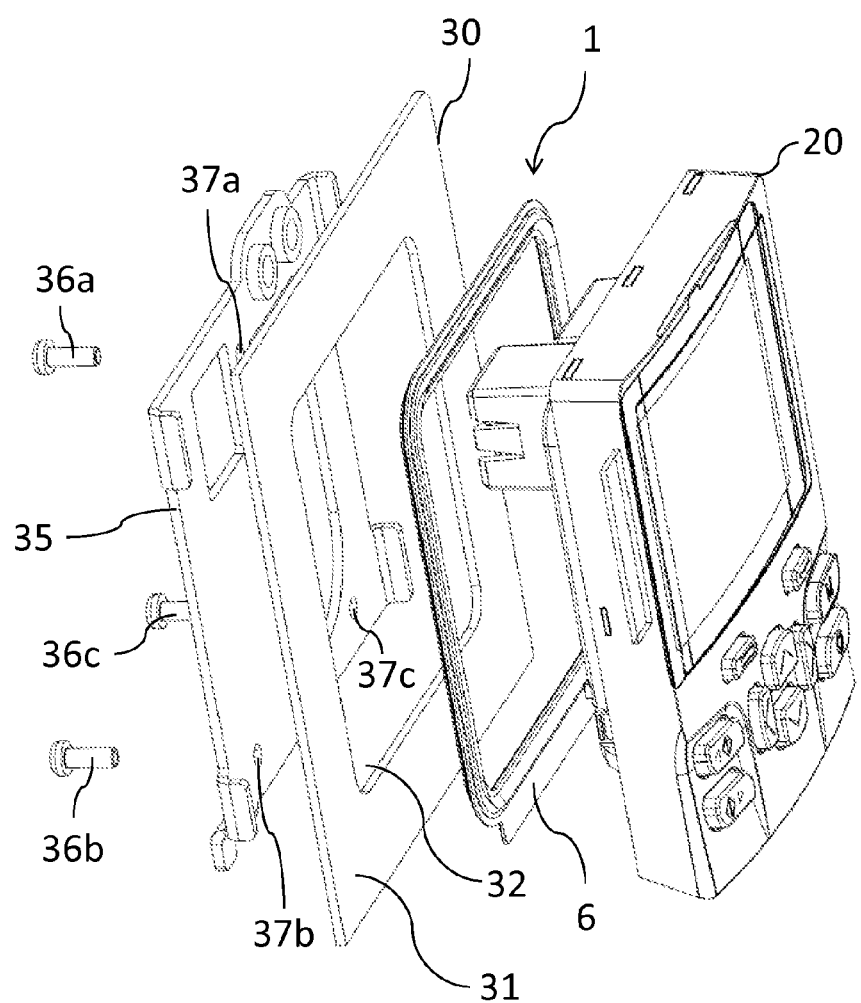
FIG. 7 shows an exploded view of the sealing element of FIG. 1 in a keypad assembly.

FIG. 7 shows the sealing element in an exploded view of an assembly keypad unit. The assembly includes a keypad unit 20, a mounting panel 30 and a securing bracket 35. The mounting panel 30 has an aperture 32. The aperture 32 in the mounting panel 30 is substantially rectangular in form. The keypad unit 20 includes components which protrude, when assembled, through the aperture 32 in the mounting panel 30. The sealing element 1 is provided around the aperture 32 of the mounting panel 30 on a first side 31 of the mounting panel.

The securing bracket 35 is provided with a plurality of fixing holes 37a, 37b, 37c to receive, fixing means, in the embodiment, screws or bolts 36a, 36b, 36c. As shown in FIG. 7, the orientation tab 6 of the sealing element 1 is provided along the lowermost edge, in use, of the sealing element 1.

Figure 8:
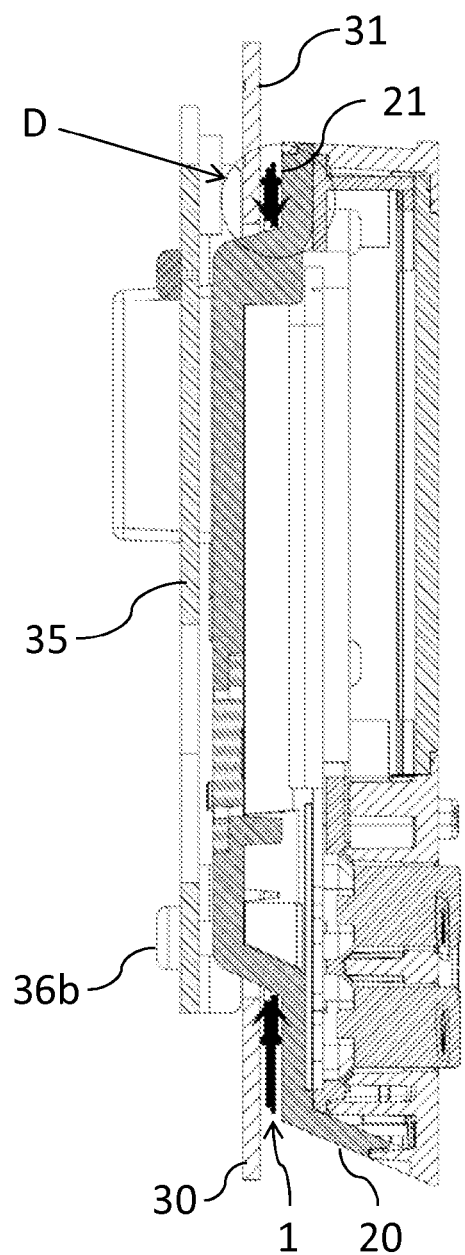
FIG. 8 shows a cross section of the keypad assembly of FIG. 7 in assembled form.

FIG. 8 shows the keypad unit in assembled form. The sealing element 1 can be seen positioned between the side or surface 31 of the mounting panel 30 and a rear side surface 21 of the keypad unit 20. The surface of 31 of the mounting panel 30 is substantially planar and parallel with the rear side surface 21 of the keypad unit.

The sealing element 1 is provided in the assembly to prevent the ingress of foreign objects or other environmental products, such as oil, water or dust to the internal workings of the keypad unit 20. The sealing unit provides a seal between the surface 31 of the mounting panel 30 and the rear side 21 of the keypad unit 20. The screws 36b, serve to hold the securing bracket 35, the mounting panel 30 and the keypad unit 20 together.

Figure 9:
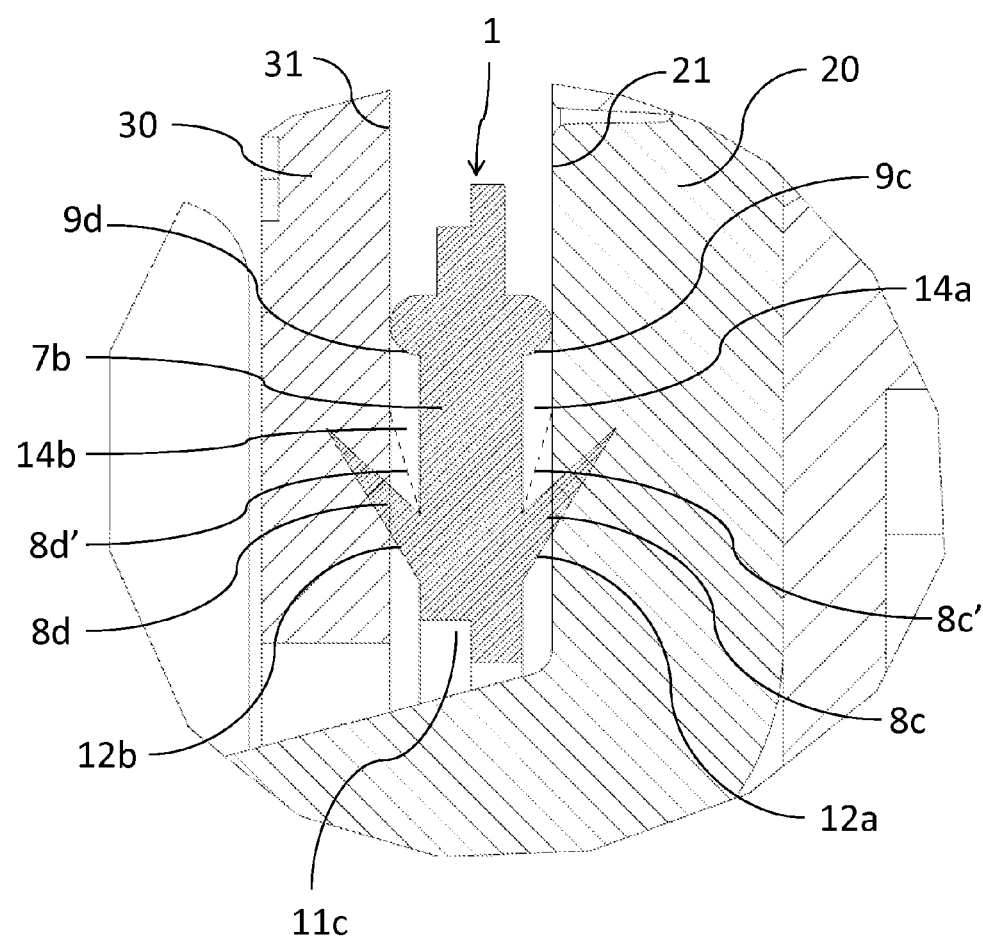
FIG. 9 shows a cross-section detail D of the sealing element in the keypad assembly shown in FIG. 8.

FIG. 9 shows the detail D of FIG. 8. The sealing element 1 is shown positioned between the surface 31 of the mounting panel 30 and a rear surface 21 of the keypad unit 20. As can be seen in FIG. 9, the second and fourth sealing parts 9c, 9d which are formed with a rounded profile, extend substantially perpendicularly from the first and second surfaces of the body 7b and lie in contact with the surface 31 of the mounting panel 30 and the rear surface 21 of the keypad unit 20.

The first and third sealing parts 8c, 8d are shown in their unbiased state. However, in use, when the sealing element 1 is positioned between the surfaces 31, 21 of the mounting panel 30 and keypad unit 20 respectively, the first and third sealing parts 8c, 8d will be angularly displaced and deformed such that the first and third sealing parts generally follow the profile schematically represented by the dash lines 8c', 8d'.

When the sealing element 1 is in place, the second and fourth sealing parts 9c, 9d are provided at the outermost sides of the sealing element 1. In use, the second and fourth sealing parts 9c, 9d provide the first seal or defence against the ingress of, for example, fluid, water or dust. Even if the water or dust should pass the second or fourth sealing parts 9c, 9d, the first and third sealing parts 8c, 8d provide a second additional seal. When deformed, the outermost surfaces 12a, 12b of the first and third sealing part 8c, 8d lie against the surface 31 of the mounting panel 30 and the innermost surface 21 of the keypad unit 20 respectively.

Depending on the environmental conditions, if there is increased pressure of fluid, for example water, which has passed by the outermost sealing parts, i.e. the second and fourth sealing parts 9c, 9d, this will act against the innermost surfaces of the first and third sealing parts 8c, 8d. The orientation of the first and third sealing parts 8c, 8d provides a pocket or cavity 14a, 14b between the first and second surfaces of the body 7b and the innermost surfaces of the first and third sealing parts 8c, 8d. The fin-like profile of the first and second sealing parts 8c, 8d and a build up in fluid pressure in the pocket 14a, 14b serves to press the first and second sealing parts 8c, 8d increasingly firmly against the adjacent surfaces 31, 21 of the mounting panel 30 and keypad unit 20 resulting in an improved seal.

Because the first and third sealing parts 8c, 8d are angularly displaceable and, in use, their outermost surfaces 12a, 12b provide a sealing surface against component parts placed adjacent thereto, a larger surface contact area can be provided.

Because the first and third sealing parts 8c, 8d are angularly displaceable and resilient in a form, the sealing element can contend with adjacent surfaces which are not perfectly planar in form.

Although in the embodiment shown, a symmetric sealing element 1 has been shown, it is also envisaged that a sealing element could be provided with only one of the first tapered sealing parts 8c, 8d with the other side being provided, for example, with an adhesive planar surface. The sealing element may also be provided with just one of the first sealing parts and/or may be provided with one or more of the second sealing parts.

The sealing element 1 may be formed integrally of a single piece of homogeneous, resilient, material. In the embodiment shown, the sealing element 1 is formed of a rubber material, for example ethylene propylene thermoplastic rubber (EPTR). The choice of materials is however dependent on the application and any suitable material may be used.

The present invention may be carried out in various ways and various modifications are envisaged to the embodiments described without extending outside the scope of the invention as defined in the accompanying claims.

The invention claimed is:

1. A sealing element for sealing between planar surfaces comprising, in cross-section, a body and a first sealing part, the first sealing part providing a sealing face, the first sealing part being connected to and angularly and resiliently displaceable relative to a first surface of the body;
   wherein in cross-section, the sealing element further comprises a second sealing part providing a sealing face, the second sealing part being spaced from the first sealing part and extending substantially perpendicular from the first surface of the body;
   wherein in cross-section, the sealing element further comprises a third sealing part, the third sealing part being formed similarly to the first sealing part, the third sealing part being connected to and inclined at an angle to a second surface of the body opposing the first surface of the body;
   wherein in cross-section, the first sealing part, in an unbiased state, is angled toward the second sealing part; and
   wherein in cross-section, the sealing element is substantially symmetric along its centreline.

2. A sealing element as claimed in claim 1, wherein in cross-section, the first sealing part, in an unbiased state, forms an angle of less than 90 degrees with the first surface of the body.

3. A sealing element as claimed in claim 1, wherein in cross-section, the first sealing part tapers from a first end thereof, where connected to the body, towards a second, free end of the first sealing part.

4. A sealing element as claimed in claim 1, wherein in cross-section, the second sealing part is formed with a rounded profile.

5. A sealing element as claimed in claim 1, wherein, in cross-section, the first sealing part is substantially in alignment with the third sealing part.

6. A sealing element as claimed in claim 1, wherein the sealing element comprises, in cross-section, a fourth sealing part, the fourth sealing part being formed similarly to the second sealing part and extending substantially perpendicular from the second surface of the body opposing the first surface of the body.

7. A sealing element as claimed in claim 6, wherein in cross-section, the second sealing part is substantially in alignment with the fourth sealing part.

8. A sealing element as claimed in claim 1, wherein in cross-section, the body is formed at its first end with a stepped profile.

9. A sealing element as claimed in claim 1, wherein in cross-section, the body is formed at its second end with a stepped profile.

10. A sealing element as claimed in claim 1, wherein in cross-section, the first and second surfaces of the body are substantially parallel.

11. A sealing element as claimed in claim 1, having a first end and a second end, wherein in cross-section, the body is formed with a reduced diameter width between the second sealing part and the second end of the body.

12. A sealing element as claimed in claim 1, wherein the sealing element forms a continuous closed loop.

13. A sealing element as claimed in claim 12, wherein the loop is formed substantially as a rectangle.

14. A sealing element as claimed in claim 13, wherein between adjacent sides of the rectangle, a radiused or rounded corner is provided.

15. A sealing element as claimed in claim 12, wherein the first and second surfaces of the body are parallel to the plane of the loop.

16. A sealing element as claimed in claim 12, wherein along an orientation tab is provided at a point on the loop.

17. A sealing element as claimed in claim 1, wherein the sealing element is formed of a resilient material.

18. A sealing element as claimed in claim 17, wherein the sealing element is formed of rubber.

19. A sealing element as claimed in claim 17, wherein the sealing element is formed of Ethylene Propylene Thermoplastic Rubber.

20. A sealing element as claimed in claim 1, wherein the sealing element is formed integrally as a single piece.

* * * * *